(12) United States Patent
Riggs

(10) Patent No.: US 7,783,554 B1
(45) Date of Patent: Aug. 24, 2010

(54) SYSTEM AND METHOD FOR BID ARCHIVE AND RETRIEVAL

(75) Inventor: Edward G. Riggs, Las Vegas, NV (US)

(73) Assignee: BidLocker, LLC, Las Vegas, NV (US)

( * ) Notice: Subject to any disclaimer, the term of this patent is extended or adjusted under 35 U.S.C. 154(b) by 1477 days.

(21) Appl. No.: 10/454,645

(22) Filed: Jun. 3, 2003

(51) Int. Cl.
*G06Q 40/00* (2006.01)

(52) U.S. Cl. .............................. 705/37; 705/1.1; 705/80; 705/50

(58) Field of Classification Search ...... 705/1, 705/26, 37, 80
See application file for complete search history.

(56) References Cited

U.S. PATENT DOCUMENTS

| | | | | |
|---|---|---|---|---|
| 5,243,515 | A * | 9/1993 | Lee ............................... | 705/37 |
| 6,236,972 | B1 * | 5/2001 | Shkedy ......................... | 705/1 |
| 6,363,365 | B1 | 3/2002 | Kou | |
| 6,449,689 | B1 * | 9/2002 | Corcoran et al. ............ | 711/113 |
| 6,647,373 | B1 * | 11/2003 | Carlton-Foss ................ | 705/37 |
| 6,766,307 | B1 * | 7/2004 | Israel et al. ................... | 705/80 |
| 7,003,674 | B1 * | 2/2006 | Hamlin ........................ | 713/193 |
| 7,315,948 | B1 * | 1/2008 | Peyravian et al. ........... | 713/178 |
| 2002/0049642 | A1 | 4/2002 | Moderegger et al. ......... | 705/26 |
| 2002/0065798 | A1 | 5/2002 | Bostleman et al. ............ | 707/1 |
| 2002/0087380 | A1 * | 7/2002 | Wang et al. .................... | 705/8 |
| 2002/0107775 | A1 | 8/2002 | Hawkins ...................... | 705/37 |
| 2003/0014326 | A1 * | 1/2003 | Ben-Meir et al. ............. | 705/26 |
| 2003/0225683 | A1 | 12/2003 | Hill et al. | |
| 2005/0234811 | A1 * | 10/2005 | Herman et al. ................ | 705/37 |

FOREIGN PATENT DOCUMENTS

| WO | WO 00/75837 | A2 | 12/2000 |
|---|---|---|---|
| WO | WO 01/18633 | * | 3/2001 |

OTHER PUBLICATIONS

Procan Software & Support, Procon's Project Collaboration System for Construction, Web Page found at: http://www.procon.uk.com/ATBUILD.htm pp. 1-9; Nov. 19, 2002.

* cited by examiner

*Primary Examiner*—Kambiz Abdi
*Assistant Examiner*—Sarah M Monfeldt
(74) *Attorney, Agent, or Firm*—Pattric J. Rawlins; Procopio Cory Hargreaves & Savitch LLP

(57) ABSTRACT

Systems and methods for securely archiving detailed bid information for later use in change order negotiation, conflict resolution, or other matters is presented. A bid containing detailed information is received at a central archive server. Upon receipt of the bid, the server timestamps and encrypts the bid. A decryption key is provided to the party who submitted the bid. The encrypted bid is then stored in a data storage area for later use. The archived bid can be compressed to optimize data storage. Upon a request by the party who submitted the bid, the bid is retrieved from data storage, decompressed if necessary, and decrypted with a key provided by the requesting party. The detailed bid information can then be used to resolve disputes, negotiate change orders, or otherwise.

27 Claims, 5 Drawing Sheets

SYSTEM AND METHOD FOR BID ARCHIVE AND RETRIEVAL

BACKGROUND

1. Field of the Invention

The present invention generally relates to the archiving of data and more particularly relates to time sensitive encrypted archiving of detailed bid information in the construction industry.

2. Related Art

In the construction industry, the process of bidding a job is considered to be very proprietary by each contractor. The methods used to arrive at costs for certain portions of a project are often highly secret and the numbers used to compute a summary bid are typically very well protected, indeed.

A substantial portion of the costs incorporated into a bid is typically due to the expenses associated with estimating the job, participating in the bidding process, managing sub-contractors, obtaining financing, and contingency planning. Often times, major cost overruns are experienced due to errors in preparing the estimated bid. Additionally, significant costs are also incurred for dispute resolution between the contractor and the job owner resulting from change orders and other situations that arise after the job has been awarded.

A particular problem associated with cost estimation and related to change orders and contingency management is the lack of sufficient detail in the bids submitted to a job owner by a contractor. Although a job is awarded on the basis of a summary bid, the bid detail, which is highly proprietary to the contractor, is usually needed to resolve disputes that arise between the contractor and the job owner. A significant drawback of the conventional bidding systems is that when the bid detail is provided for dispute resolution, the content of the bid detail is often subject to scrutiny and the veracity of the party providing the bid detail is nearly always called into question. This problem persists because of the highly confidential nature of the detailed bid information and a contractor's reluctance to provide any job owner or other unrelated party with this proprietary information.

Thus, the conventional bidding systems have created a need that remains unmet by the industry. Therefore, what is needed is a system and method that allows the detailed bid information used to prepare a bid for a job to remain confidential and also allows the same detailed bid information to be available for dispute resolution with an authenticated chain of custody.

SUMMARY

A construction bid comprising the detailed information used to arrive at the line item or lump sum numbers in the summary bid is archived at the time bids are entered. The bids are received electronically, encrypted, time-stamped, compressed and stored in a data storage device. The encryption key is provided to the party submitting the bid. Upon later request, the archived bid is retrieved from the data storage area, decompressed, and decrypted with the key. The time stamp information and decompressed/decrypted bid is then validated to provide certification that the detailed bid information is authentic in both data content and time-stamp.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods to archive a detailed bid and then later retrieve the archived bid and provide a certified copy of the original bid detail. For example, one method as disclosed herein allows for competing contractors to electronically submit their respective bids, including bid details, to a network based archive server. Later, upon request by a contractor, the archive server can provide to an owner a certified copy of the bid, including bid details. This detailed bid information can then be used to, for example, help resolve a dispute between the owner and the contractor.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
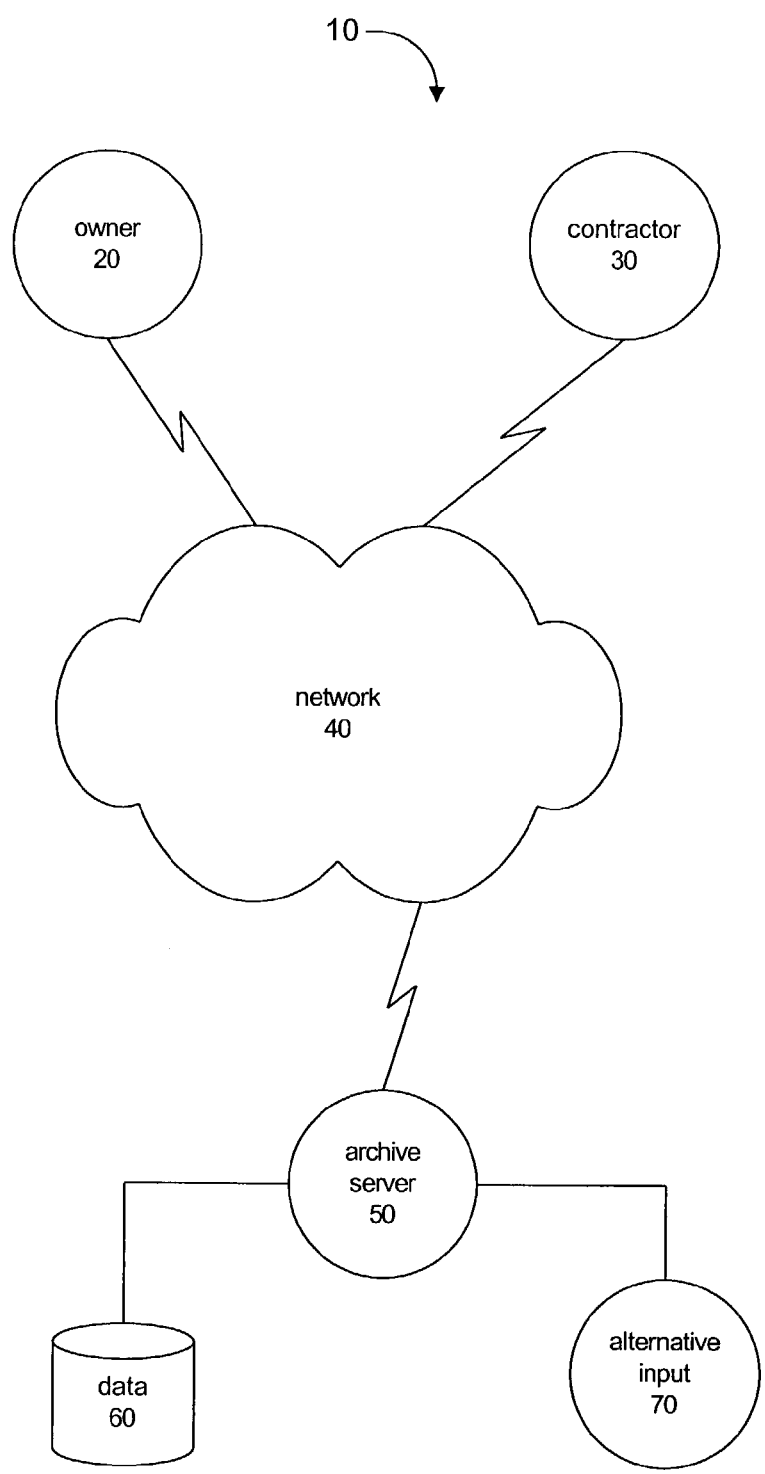
FIG. 1 is a high level network diagram illustrating an example system for bid archive and retrieval according to an embodiment of the present invention.

FIG. 1 is a high level network diagram illustrating an example system 10 for bid archive and retrieval according to an embodiment of the present invention. The system 10 comprises an owner 20 and a contractor 30 communicatively coupled with an archive server 50 over a network 40. The archive server 50 is connected with a data storage area 60 and an alternative input device 70. Although not illustrated, multiple owners 20 and contractors 30 may comprise the system 10. Moreover, multiple archive servers 50 may also be provided.

In general, the owner 20 can access the archive server 50 via the network 40 to set up and maintain one or more projects. Once a project has been established, contractor 30 can access the archive server 50 via the network 40 to submit a detailed bid on the project. Advantageously, the project characteristics and perhaps bidding guidelines can be maintained on the archive server 50 to provide instruction to the various contractors 30 that submit bids. All bids for a project are received by the archive server 50 and securely stored in a portion of the data storage area 60 reserved for the particular project. At the closure of the bid window (i.e., the end of the time during which bids will be accepted), summary information from the bids can be provided to the owner 30 for consideration. The detailed information from the bids, however, advantageously remains securely stored in the data storage area 60.

The owner 20 can be any of a variety of entities that serve the function of soliciting bids for a job or managing a project that accepts bids from potential companies or individuals who desire to do the work associated with the job or project. For example, the owner 20 can be a federal or state government entity, a commercial entity, a homeowner, a general contractor, or a project owner or project manager. Similarly, the contractor 30 can be any of a variety of entities that serve the function of submitting bids to do the job or project as requested by the owner. For example, the contractor 30 can be a general contractor, a sub-contractor, an individual, or any other party submitting a bid.

Preferably, the owner 20 and the contractor 30 are both communicatively coupled with the network 40 using a general purpose computer or some other network accessible device. For example, the access device can be a personal computer, a laptop computer, a personal digital assistant, a wireless communication device, a fax machine, a scanner, or other type of network accessible device. Additionally, the network accessible device being employed by the owner 20 and the contractor 30 preferably provides a local software utility (not shown) that is capable of establishing a communication link between the archive server 50 and the owner 20 or the contractor 30. For example, a web browser utility can provide the necessary communication link. Alternatively, a custom software utility can also be employed to establish a secure link with the archive server 50.

The network 40 can be a wired network or wireless network. The network 40 can also be a public or private network. For example, the network 40 can include a public switched telephone network ("PSTN"), a wireless communication network, the Internet, a private corporate local area network ("LAN"), a public or private wide area network ("WAN"), or some combination of these and other types of networks. Additionally, various communication protocols may be employed by one or more different networks that together comprise network 40.

Figure 6:
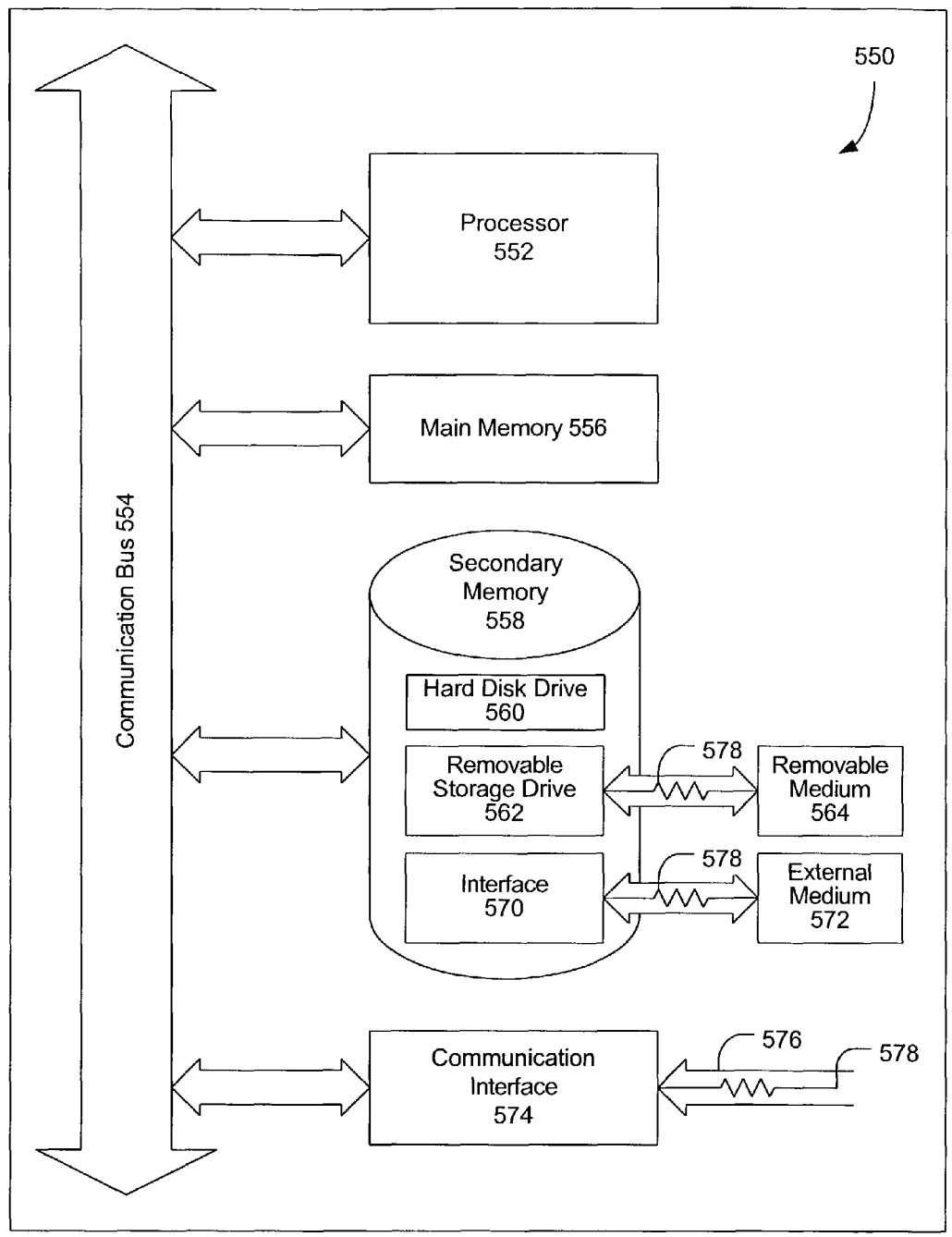
FIG. 6 is a block diagram illustrating an exemplary computer system as may be used in connection with various embodiments described herein.

The archive server 50 can be any of a variety of general purpose computer, for example, the type of general purpose computer illustrated and described with respect to FIG. 6. Preferably, the archive server 50 is communicatively coupled with the owner 20 and the contractor 30 through the network 40. Additionally, archive server 50 preferably has multimedia input capabilities such that it can receive text files, graphical images, compressed text and images, and various other data representation formats.

The data storage area 60 is connected to the archive server 50 and preferably provides persistent data storage capabilities. For example, the data storage area 60 can be in the form of a file system, a database such as a database management system ("DBMS"), an external storage drive, a magneto-optical storage drive, tape drive, or compact disc drive, just to name a few. Advantageously, the data storage area 60 may provide removable media storage whereby volumes of archived data may be removed from the location for secure offsite storage.

The archive server 50 is also connected with an alternative input device 70. The alternative input device can be any of a variety of input devices, for example a scanner or a fax machine. The alternative input device 70 may also be an input/output device capable of reading various types of media such as a disk drive (CD or floppy), tape drive, and USB drive, just to name a few. In one embodiment, a contractor 30 can bring the detailed bid information to a particular location such as a work station in an office or a remote kiosk where the alternative input device 70 is located. The detailed bid information can then be received by the alternative input device 70 and provided to the archive server 50. In an alternative embodiment, the validation and encryption processes can take place at the alternative input device 70 prior to being provided to the archive server 50.

The alternative input device 70 can also be a modem allowing dial up access to the archive server 50. Additionally, the alternative input device 70 can be a server side software application that establishes a secure connection with a corresponding client side software application. In such an embodiment, the client and server software applications preferably establish a secure data link and allow for the secure transmission of data directly to and from, for example, the owner 20 and the archive server 50. Similarly, in such an embodiment the client and server software applications preferably allow for the secure transmission of data directly to and from the contractor 30 and the archive server 50.

For the sake of clarity and consistency, the detailed description will describe the invention in the context of an example embodiment where the owner 20 is an agency of the federal or state government that is responsible for road construction projects. Similarly, in the example embodiment the contractor 30 is a general contractor who does road construction work. Other owners and contractors are, of course, contemplated by the broad scope of the present invention and therefore the example embodiment described herein should not be construed to limit the scope of the claims.

Figure 2:
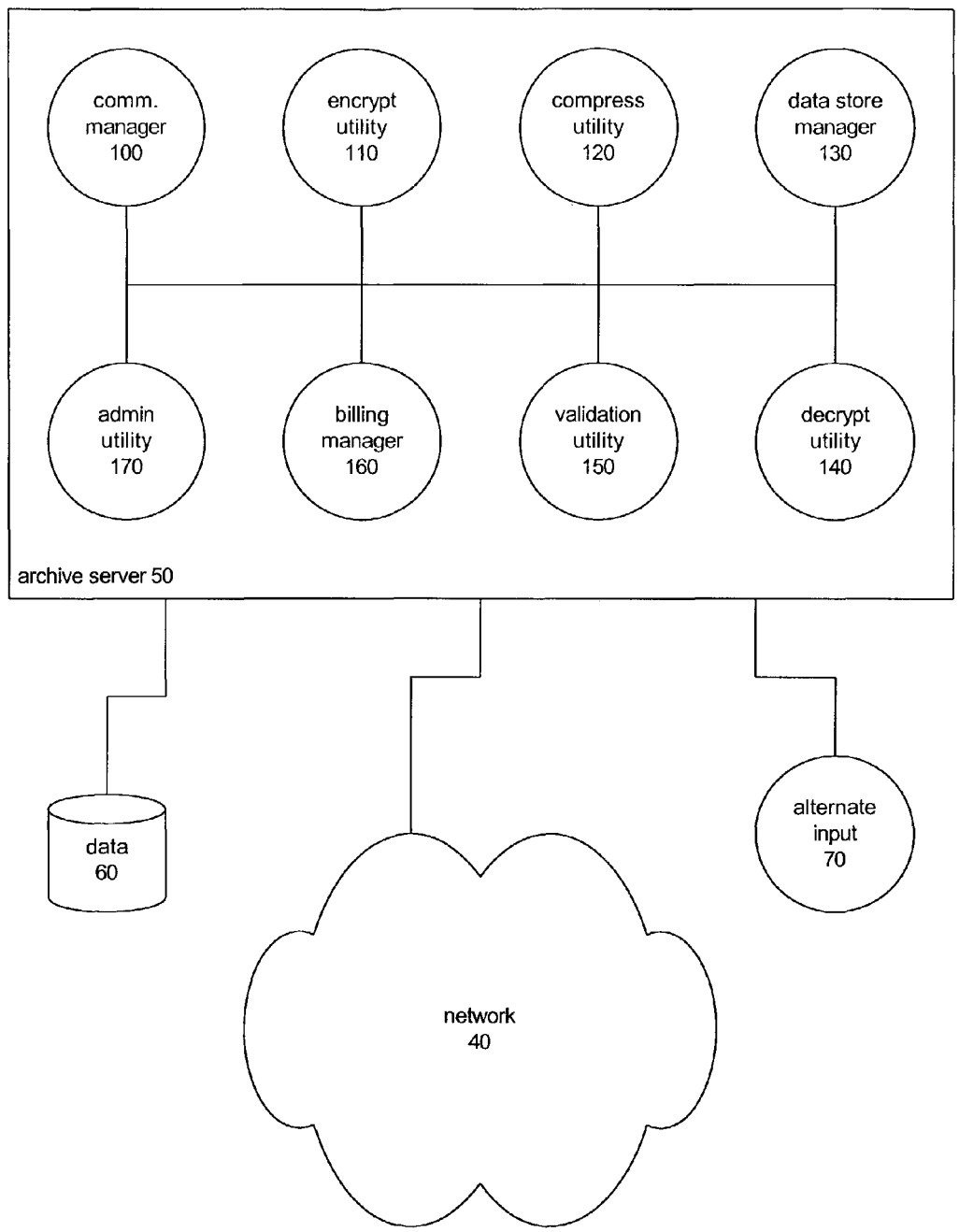
FIG. 2 is a block diagram illustrating an example archive server according to an embodiment of the present invention.

FIG. 2 is a block diagram illustrating an example archive server 50 according to an embodiment of the present invention. The archive server 50 is connected with a data storage area 60 and an alternate input device 70 as previously described. Archive server 50 is also communicatively coupled with a network 40. In the illustrated embodiment, the archive server 50 comprises a plurality of software modules, including a communications manager 100, an encryption utility 110, a compression utility 120, a data store manager 130, a decryption utility 140, a validation utility 150, a billing manager 160, and an administrative utility 170.

It should be understood that the various software modules in the illustrated embodiment may be combined or separated into more or fewer modules that carry out the same set of functions. For example, the compression utility 120 may be separated into a compression utility and a decompression utility. Similarly, the encryption utility 110 and the decryption utility 140 may be combined into a single utility that handles both encryption and decryption.

The communication manager 100 generally handles the input and output for the archive server. Such input and output includes communications over network 40. For example, communications over network 40 can include bid submissions, bid archive retrieval requests, and other communications including, for example, establishing a secure network session with alternate input device 70. Additionally, communication manager 100 may place a timestamp on any bids that are received from a contractor.

The encryption utility 110 encrypts the various detailed bids that are submitted by contractors. Preferably, encryption automatically takes place immediately upon receipt of a bid. This ensures that the content of the detailed bid, which typically includes proprietary information that requires a high level of security, is protected at all times on the archive server 50. Alternatively, the detailed bid may be parsed to determine that submitted bid meets the requirements for a complete bid. Such an implementation can advantageously be automated so that no detailed bid information is stored in memory or seen by any administrators of the server 50.

In one embodiment, the encryption utility 110 employs encryption standards such as those set forth by the National Institute of Standards and Technology ("NIST"). For example, encryption utility 110 may use the advanced encryption standard ("AES"), which is incorporated herein by reference in its entirety.

Compression utility 120 advantageously compresses bids before they are placed in long term storage in the data storage area 60. Additionally, compression utility 120 may also decompress bids that are retrieved from data storage area 60. Conventional compression techniques may be employed by compression utility 120 such as the popular WinZip® application or other implementations of the standard zip format such as PKZip. Preferably, compression utility 120 employs a loss-less compression technique so that no information in the detailed bid is lost as a result of compression and decompression.

Data store manager 130 generally handles the placement and retrieval of compressed and encrypted detailed bids in the data storage area 60. Preferably, data store manager 130 is configured to manage various alternative implementations of the data storage area 60. For example, data store manager 130 can store and retrieve files using a database management system ("DMBS") or a standard file system. Additionally, data store manager 130 is preferably configured to work with various media such as a computer hard drive, compact disc, or tape, just to name a few.

The decryption utility 140 decrypts the various detailed bids that are retrieved from the data storage area 60. Advantageously, decryption can occur in a secure fashion that limits the exposure of the detailed bid information. For example, the file to be decrypted may be temporarily placed in a storage area that is isolated from network 40 and the decryption can take place in that temporary storage area. Alternatively, the decryption utility 140 may read the archived bid into volatile memory and decrypt the bid in memory without ever storing the decrypted bid in persistent storage (e.g., on a hard drive). In one embodiment, the decryption utility 140 is configured to decrypt archived bids that are encrypted using AES encryption.

The validation utility 150 can perform various validation functions as required by the archive server 50. For example, the validation utility 150 can check detailed bid submissions to ensure that the submission has correctly identified the job for which it is being submitted. In one embodiment, a job can be identified by a unique number and the validation utility can verify that the summary bid information matches the summary bid information required by the job. Additionally, the validation utility 150 can check decrypted bids to ensure that they have been decrypted correctly, for example by performing a checksum on a decrypted bid. Furthermore, the validation utility 150 can provide authentication of the date and time that a detailed bid was archived. Such an authentication can be very valuable for objectively identifying what detailed bid information was in existence prior to the close of the bid window.

Billing manager 160 preferably monitors usage of the archive server 50 and provides reporting and invoicing capabilities. For example, billing manager 160 may maintain records of disk space allocated to or in use by each owner that uses the system. Billing manager 160 may also maintain records of data transmission times or the byte size of data transmissions associated with a particular owner or preferably with each particular job. Advantageously, billing manager 160 can provide reports that detail a particular owner's use of the archive server 50 on a job-by-job basis. Such a report may include information about the amount of space used in the data storage area 60, the byte size of transmissions, the communication or network time of transmissions, total projects underway, total bids submitted (by project and overall), monthly fees, fees per retrieval, fees per new project creation, and other useful information germane to billing an owner for use of the archive server 50.

Billing manager 160 may also accept payments, for example, by credit card. In one embodiment, payment may be required from a contractor upon submission of a bid for a particular job. For example, an owner may impose a bid submission fee on contractors to ensure that only serious bids are submitted. Such a fee can advantageously be collected by the billing manager 160 prior to or contemporaneously with submission.

Administrative utility 170 preferably allows owners to interact with the archive server 50. For example, an owner can initiate a new job using the administrative utility 170. Creating a new job may require the owner to submit information such as the summary bid requirements, the bid submission fee (if any), the bid window (beginning time and ending time), and other information. Additionally, an owner can review information relating to the total number of megabytes being used, the total number of jobs with open bidding windows, the total number of jobs with archived bids. Other useful information can also be provided to owners through the administrative utility.

Administrative utility 170 also preferably allows an owner to review summary bid information provided with a detailed bid submission. Administrative utility 170 may also allow an owner to sort the submitted bids, for example alphabetically by the name of the contractor or alternatively by the amount of the bid. Other useful services can be provided to owners by the administrative utility 170 such as the ability to run reports summarizing the owner's use of the archive server 50, billing information, trends in submissions, trends in retrievals, etc.

Figure 3:
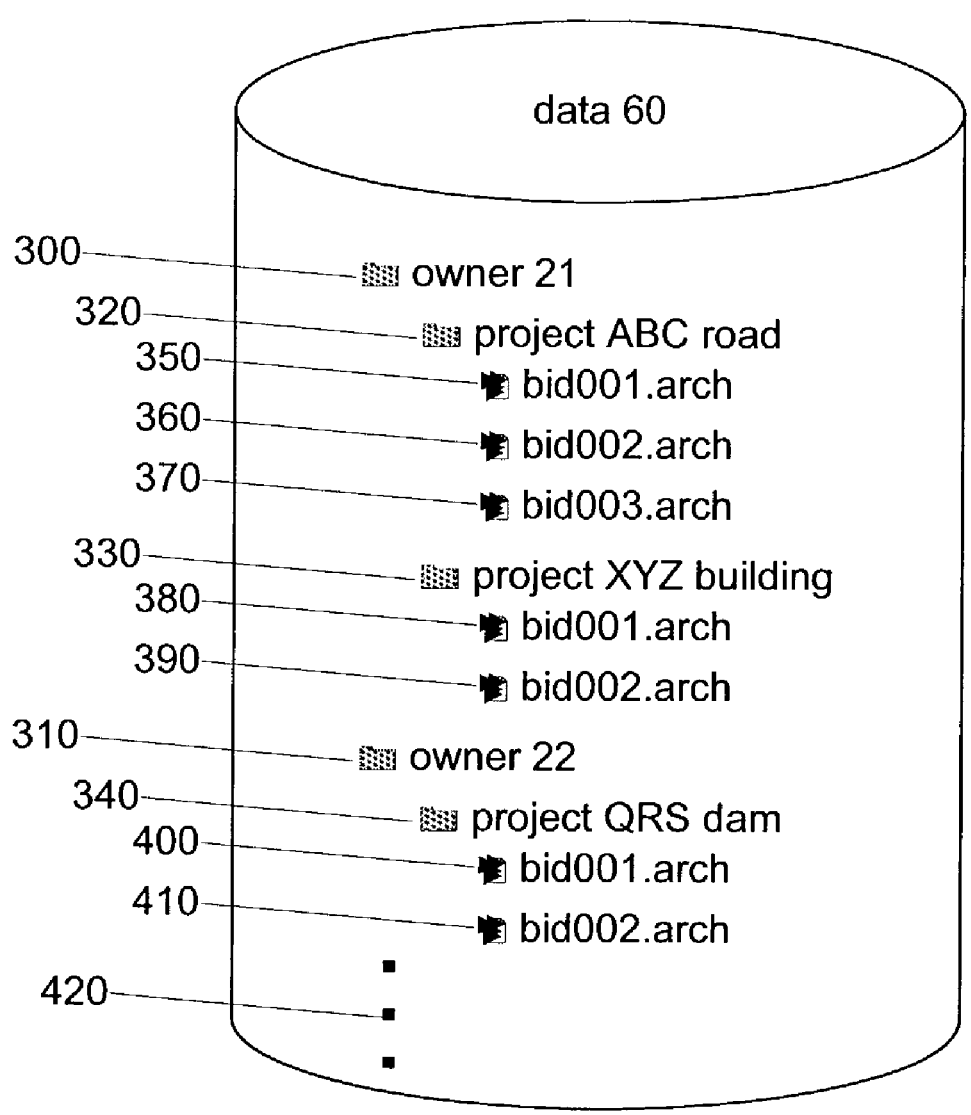
FIG. 3 is a block diagram illustrating an example data storage area according to an embodiment of the present invention.

FIG. 3 is a block diagram illustrating an example data storage area 60 according to an embodiment of the present invention. In the illustrated embodiment, the data storage area 60 is shown in a file system format. Occupying the root level of the file system are a plurality of directories, for example directory 300 and 310. Preferably, each directory corresponds to a discrete owner. Contained within each owner's directory are one or more sub-directories, for example sub-directories 320, 330, and 340. Each of the sub-directories advantageously correspond to a discrete project that has been set up by the owner. Within each of the project directories, a number of files can be stored, for example, files 350, 360, 370, 380, 390, 400, and 410. Each of the files stored in a project directory are preferably encrypted and compressed bid archives containing the detailed bid information provided by the contractor who submitted the bid. Although not illustrated, additional owner directories with their corresponding project sub-directories and associated bid archives can be stored in data storage area 60.

In one embodiment, all of the bids submitted for a particular job can be stored in a project directory. Alternatively, only the bid that was ultimately awarded the job can be stored in the project directory. The policy for storing either all bids or a single bid in a project directory is preferably established by the owner when creating the new project. As previously mentioned, data storage area 60 can be implemented in other formats than a conventional file system. For example, the data can be stored using a database management system or other utility.

Figure 4:
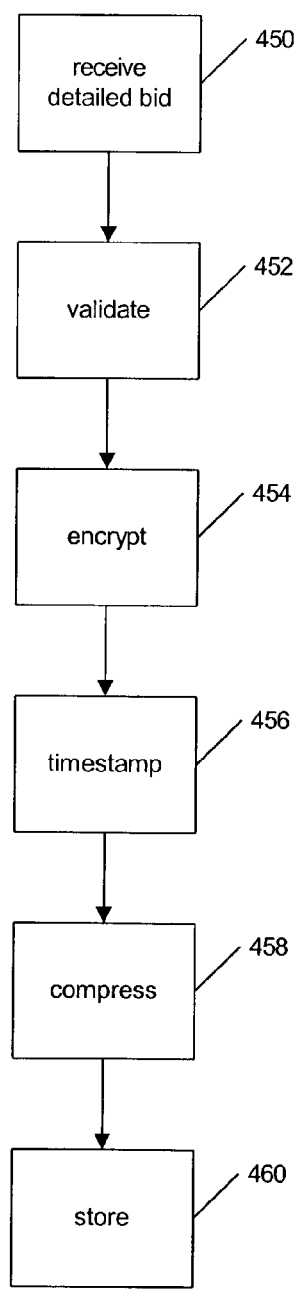
FIG. 4 is a flow diagram illustrating an example process for archiving a bid according to an embodiment of the present invention.

FIG. 4 is a flow diagram illustrating an example process for archiving a bid according to an embodiment of the present invention. Initially, in step 450 the archive server receives a detailed bid from a contractor. The detailed bid can be received via a network or alternatively through an input device. For example, network submissions may be provided as a file attached to an email, as a file or text submitted through a web page, a file transfer program, or some other electronic data transfer utility. Alternatively, network submissions may be received through a telephone network, for example, as a fax. The fax, if received as an image, can then be scrutinized to convert the image to text.

An input device can also be used to submit a bid. For example, a bid may be entered directly to the archive server through a keyboard. Alternatively, a bid may be submitted through a scanner connected to the archive server. In such an embodiment, the scanned image would be then be scrutinized to convert the image to text.

Preferably, bids that are received include certain information including the job number or other information identifying the project for which the bid is being submitted. Additionally, information such as the contractor name and contact information is preferably submitted. Importantly, the bid also includes summary bid information and detailed bid information.

Summary bid information is the type of information that is conventionally submitted by a contractor when submitting a bid for a particular job. For example, summary bid information would include line items as defined by the owner of the project that correspond to the various discrete elements of the project. The summary bid information typically would include the estimated unit price for each line item. The summary bid information would also include the total estimated price for each line item. The type of summary bid information submitted with a bid will vary according to the particular job, as will be understood by one having skill in the art.

Detailed bid information, on the other hand, includes much more information that is usually considered to be highly confidential and proprietary to the contractor submitting the bid. For example, rather than merely providing a unit cost and a total cost for a particular line item in a job (i.e., summary bid information), when providing detailed bid information the contractor would include information such as the man hours required for the job, labor costs, equipment costs including hourly rates, material costs, fuel costs, special notes unique to the job, methods and means of construction, and the duration for various phases or bid items, just to name a few.

In step 452, the archive server next validates the bid that has been submitted. Validation of a bid can range from very strict scrutiny to a mere confirmation that the job number is valid. In one embodiment, the archive server parses a submitted bid to examine certain predetermined portions of the summary bid information. These predetermined portions can then be compared to the project definition provided by the owner to ensure that the bid submitted is actually for the identified job.

For example, a bid may be submitted with a particular job number. The job number is valid but upon examination, the archive server determines that the summary bid information does not match up with the project information provided by the owner. In such a case, the archive server can then inform the contractor submitting the bid that the bid is not correct or the job number is not correct.

Once the bid has been received and validated, the archive server next encrypts the bid, as illustrated in step 454. Preferably, the encryption serves to securely protect the content of the submitted bid, and particularly the detailed bid information. Furthermore, as part of the encryption process the archive server preferably provides a decryption key to the contractor or the contractor can provide a personal key upon submitting the detailed bid. A copy of the decryption key may or may not be stored on the archive server. The archive server can provide the decryption key to the contractor via a return electronic communication such as an email. Alternatively, the archive server can provide the decryption key to the contractor via facsimile or by way of a hard copy print out that is mailed to the contractor.

In one embodiment, a first portion of the decryption key may be provided to the contractor and a second portion of the decryption key may be provided to the job owner. Such a system would ensure that decryption of the detailed bid information would require cooperation or at least agreement between the job owner and the contractor because they would each have to provide their respective decryption keys.

In addition to encrypting the bid, the bid is also electronically time and date stamped to record when the bid was received from the contractor, as shown in step 456. The timestamp is preferably determined immediately upon receipt of the bid. In one embodiment, the timestamp itself can be incorporated into the encryption process such that when the bid is later decrypted the timestamp is also revealed. Advantageously, the timestamp allows the archive server to authenticate upon retrieval just when the detailed bid information was submitted to the archive server. This authentication can have great value in a situation where it is critical to identify what detailed bid information the contractor was in possession of during the bidding process.

Once the bid has been validated, timestamped, and encrypted, for example in volatile memory so that no party can see the detailed bid information, in step 458 the archive server compresses the bid for efficient storage in the data storage area. Preferably, the compression technique is a lossless technique so that upon decompressing the bid, no information is lost. Once the bid has been compressed, the bid is stored in the data storage area, as illustrated in step 460. Preferably, at some point during the process, the archive server sends identification information to the contractor that uniquely identifies the bid in the archive server. This information can be sent separately from or together with the decryption key.

Figure 5:
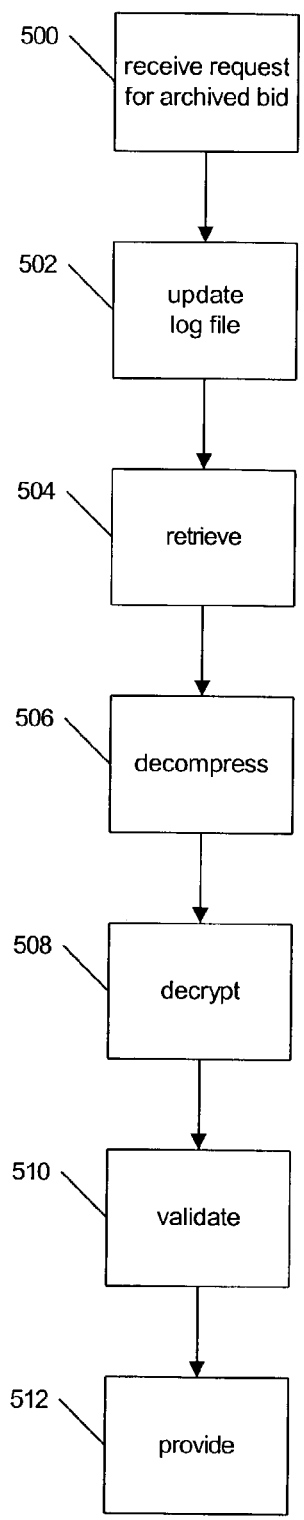
FIG. 5 is a flow diagram illustrating an example process for retrieving an archived bid according to an embodiment of the present invention.

FIG. 5 is a flow diagram illustrating an example process for retrieving an archived bid according to an embodiment of the present invention. Initially in the retrieval process, the archive server receives a request for an archived bid. The request preferably includes an identification information that uniquely identifies the bid. For example, the request may include the identification number assigned by the archive server during the archival process. Additionally, the request can preferably include an owner identification number and a contractor identification number. Furthermore, the request preferably includes the decryption key.

The request can be received by the archive server in an electronic communication such as an email, a fax, a front end software utility, or via a web interface. The request can also be received by regular mail. Preferably, the request is submitted electronically. Once the request is received the archive server may place a notice in a log file, as shown in step 502. The log file preferably maintains information related to access of the archived bids. This information can be later used for billing purposes or as an electronic history of successful and unsuccessful access for each bid.

Once the bid has been identified from the information provided in the request, in step 504 the bid is retrieved from the data storage area. This process may require that physical media such as a CD or tape be loaded into the archive server. After the bid has been loaded onto the archive server, the bid is decompressed in step 506 and decrypted in step 508. Advantageously, the decryption key provided to the contractor when the bid was submitted serves the dual purpose of securing the bid because the detailed bid information remains encrypted until the correct decryption key is provided. Thus, no unauthorized access can be obtained.

After the bid is decrypted, the bid is preferably validated in step 510. Validation at this point can include validating the number of bytes in the bid, for example through a checksum procedure. Additionally, the timestamp can be validated to authenticate the archive date of the bid and the information included in the bid. Once the bid has been validated both for completeness and for archive date, the bid can be provided to the requesting party.

A significant advantage of the archive server and the validation of the timestamp is that it provides a contractor with authentication of the detailed information used to arrive at the summary bid information. Thus, if a dispute were to arise between the contractor and the owner, the contractor would be able to prove to the satisfaction of the owner the detailed bid information as it existed at the time the bid was submitted.

FIG. 6 is a block diagram illustrating an exemplary computer system 550 that may be used in connection with the various embodiments described herein. For example, the computer system 550 may be used in conjunction with an archive server, a contractor access point, or an owner access point. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry, standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g., printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. For example, the software may be loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

While the particular systems and methods for bid archive and retrieval herein shown and described in detail is fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method, the method comprising:
    archiving detailed construction project bid information on a bid archive server, said bid archive server comprising one or more processors, and communicatively coupled with a data communications network, where the one or more processors are further performing the steps comprising:
    receiving at the bid archive server a request from an owner identifying summary bid requirements, the request seeking competing bids for a construction project, said competing bids comprising detailed construction project bid information;
    receiving at the bid archive server a plurality of competing bids via the data communications network during an open bid window, wherein each of the plurality of competing bids comprises summary bid information and detailed bid information;
        wherein the summary bid information includes the summary bid requirements;
    time-stamping each of the plurality of competing bids;
    encrypting at least the detailed bid information for each of the plurality of competing bids;
    providing a decryption key to a submitter of a competing bid, wherein the decryption key is required to decrypt the encrypted detailed bid information of the competing bid;
    providing only the summary bid information of the plurality of competing bids to the owner, for consideration by the owner, wherein the owner determines a winning bid amongst the plurality of competing bids using only the summary bid information of the plurality of competing bids;
    storing the encrypted detailed bid information for at least the winning bid in a data storage area of the bid archive server after the bid window has closed and the winning bid has been awarded,
    wherein the encrypted detailed bid information remains protected in the data storage area on the bid archive server until said decryption key provided to said submitter is provided to the bid archive server.

2. The method of claim 1, further comprising compressing the stored bid.

3. The method of claim 1, further comprising comparing the summary bid information to the identified summary bid requirements to validate the bid.

4. The method of claim 1, further comprising assigning a unique identifier to the stored bid.

5. The method of claim 4, further comprising providing the unique identifier in response to receiving the bid.

6. The method of claim 4, wherein the unique identifier is provided as part of the bid.

7. The method of claim 1, wherein the storing step comprises saving the bid in a database management system.

8. The method of claim 1, wherein the storing step comprises saving the bid on a removable storage medium.

9. The method of claim 1, further comprising:
    receiving a bid archive retrieval request at the bid archive server, the bid archive retrieval request uniquely identifying an encrypted detailed bid information stored in a data storage area of the bid archive server;
    obtaining the encrypted detailed bid information from the data storage area, the encrypted detailed bid information comprising a timestamp and the encrypted detailed bid information;
    receiving at the bid archive server the corresponding decryption key;
    decrypting the detailed bid information using the received decryption key; and
    providing the timestamp and the decrypted detailed bid information in response to the bid archive retrieval request.

10. The method of claim 9, further comprising decompressing the bid.

11. The method of claim 9, wherein the bid archive retrieval request comprises a unique identifier and wherein the obtaining step further comprises using the unique identifier to obtain the archived bid from the data storage area.

12. The method of claim 9, wherein the bid archive retrieval request comprises the decryption key.

13. The method of claim 9, where in the timestamp authenticates that the original detailed bid information was received during the open bid window.

14. The method of claim 9, wherein the obtaining step further comprises retrieving the bid from a database management system.

15. The method of claim 9, wherein the obtaining step further comprises retrieving the bid from a removable storage medium.

16. The method of claim 9, further comprising validating the authenticity of the detailed bid information.

17. The method of claim 9, wherein the providing step further comprises providing to a requestor.

18. The method of claim 9, wherein the bid archive retrieval request includes contact information for a third party and the providing step further comprises providing the timestamp and the detailed bid information to the third party.

19. A system for archiving detailed construction project bid information, the system comprising:
   an archive server, said archive server comprising:
      a processor communicatively coupled with a data communications network;
         said processor communicatively coupled with a computer readable storage medium, said computer readable medium configured to store computer executable programmed modules and said processor configured to execute said programmed modules stored on the computer readable medium;
      a communication interface configured to receive a plurality of bids via the data communications network during an open bid window, each of the plurality of bids comprising summary bid information and detailed bid information wherein the summary bid information includes summary bid requirements
      an encryption module stored in the computer readable storage medium and configured to encrypt at least the detailed bid information of the plurality of bids and time-stamp each of the plurality of bids upon receipt of each of the plurality of bids and provide a decryption key to a submitter of each of the plurality of bids;
      an administration module stored in the computer readable storage medium and configured to provide only the summary bid information of the plurality of bids to an owner for consideration by the owner, wherein the owner determines the winning bid using only the summary bid information of the plurality of bids;
      a data storage module stored in the computer readable storage medium and configured to store at least the encrypted detailed bid information for the winning bid of the plurality of bids in the computer readable storage medium after the bid window has closed and after the winning bid has been awarded.

20. The system of claim 19, wherein the archive server further comprises a validation module stored in the computer readable storage medium and configured to compare the summary bid information to the identified summary bid requirements to validate the bid.

21. A method, the method comprising:
   archiving detailed construction project bid information submitted to an archive server via a data communication network, said archive server comprising one or more processors;
   where the one or more processors are further performing the steps comprising:
   receiving at the archive server a request from an owner identifying summary bid requirements, the request seeking competing bids for a construction project;
   receiving at the archive server during an open bid window a plurality of construction project bids from a plurality of bidders, each construction project bid containing summary construction project bid information and detailed construction project bid information,
      wherein the detailed construction project bid information includes information that is confidential to a bidder;
      wherein the summary construction project bid information includes the summary bid requirements;
   storing at the archive server an encrypted form of the detailed construction project bid information for each bidder of the plurality of bidders, wherein each bidder of the plurality of bidders holds a decryption key for their respective detailed construction project bid information;
   receiving at the archive server an indication of a winning bid from the owner;
   storing the encrypted detailed construction project bid information for the winning bid in a data storage area of the archive server;
   receiving at the archive server a request for the stored encrypted detailed construction project bid information of the winning bid and the corresponding decryption key for the stored winning bid;
   decrypting the encrypted detailed construction project bid for information for the stored winning bid using the decryption key;
   providing the decrypted detailed construction project bid information for the stored winning bid in response to said request.

22. The method of claim 21, further comprising resolving a construction project dispute using the decrypted detailed bid information.

23. The method of claim 21, wherein the key is received from the winning bidder.

24. The method of claim 21, wherein the key is received from a third-party holding the key on behalf of the winning bidder.

25. The method of claim 21, further comprising electronically time stamping each of the plurality of bids upon receipt.

26. The method of claim 25, further comprising verifying the time stamp on the decrypted detailed construction project bid information is within the open bid window.

27. The method of claim 21, wherein a first portion of the decryption key is held by the bidder and a second portion of the decryption key is held by another party.

* * * * *